May 28, 1935. H. B. M. DE LANGE 2,003,252
TRACK SHIFTING DEVICE
Filed June 30, 1930
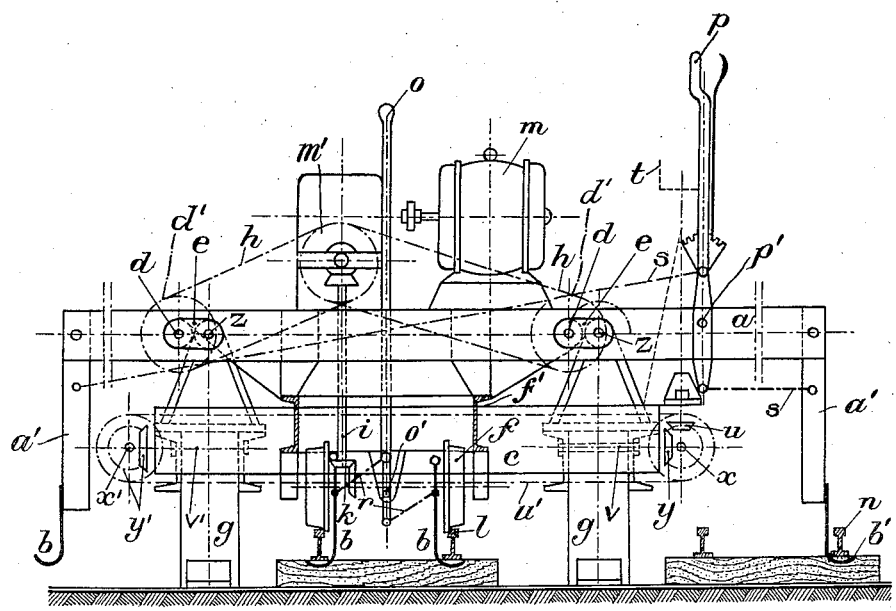
Inventor:
Hendrik B. M. de Lange
by Richard E. Babcock
Attorney Patented May 28, 1935

2,003,252

UNITED STATES PATENT OFFICE 2,003,252

TRACK SHIFTING DEVICE

Hendrik Bernardus Marie de Lange, Nijmegen, Netherlands

Application June 30, 1930, Serial No. 465,013
In the Netherlands July 12, 1929

4 Claims. (Cl. 104—8)

The present invention relates to machines for laterally shifting railroad tracks.

The primary object of the present invention is to provide a simple, powerful, and efficient machine for quickly moving railroad tracks in either lateral direction as may be desired.

One embodiment of my invention is diagrammatically illustrated in the single view of the accompanying drawing, which view is an end elevation, partly in section.

Referring in detail to the drawing, $f'$ designates the main frame of the machine mounted on usual track wheels or rail wheels $f$. A cross beam $a$ is rigidly mounted on frame $f'$ so as to be immovable with relation thereto and has pivotally mounted in its respective end portions depending arms $a'$. A pair of hooks $b$ adapted to hook under the rails $l$ of the main line, or the line upon which the wheels $f$ are located, are pivotally connected to the frame $f'$ and are moved into and out of hooking relation about their pivotal points by means of link rods $r$ pivotally connected to said hooks and to an operating lever $o$ pivotally mounted as at $o'$, the points of connection of said rods $r$ being on opposite sides of the pivotal point $o'$. Similarly hooks $b'$ are respectively rigidly connected to the lower portions of the respective arms $a'$ which in turn are pivotally connected to control link rods $s$ which are pivotally connected to a control lever $p$ on opposite sides of pivotal mounting $p'$ of said lever $p$ on the cross beam $a$. Thus, by a swinging of the lever $o$ to the right the hooks $b$ will swing about their pivots so that their lower ends will swing toward each other and thus out from underneath the rails $l$, whereas movement of the lever $o$ into vertical position shown will cause the lower ends of said hooks $b$ to move away from each other to hook under the said rails $l$. Similarly movement of the lever $p$ to the right will serve to swing the legs $a'$ toward each other and so move the hooks $b'$ out of hooking relation to the outer rail $n$ of an adjacent track or tracks.

A pair of longitudinally extending shafts $d$ are mounted respectively adjacent the respective sides of the frame $f'$ in bearings rigid therewith and are formed with crank arms $e$ having wrist pins $z$ to which are respectively permanently pivotally connected the upper ends of legs $g$. The legs $g$ are rigidly connected together by a frame $c$, said frame $c$ and legs $g$ together constituting a unitary supporting element which is caused to move with relation to said frame $f'$ vertically and laterally in accordance with the movement of the cranks $e$ and their respective wrist pins $z$. Sprocket wheels $d'$ are respectively mounted on the respective shafts $d$ and connected by means of drive chains $h$ to corresponding drive wheels $m'$ of a suitable electric motor or other source of power $m$ rigidly mounted on the frame $f'$, the driving connection between said shafts $d$ and the drive wheels $m'$ being such that the shafts $d$ will always rotate in the same direction and with their cranks $e$ in the same angular relation to their respective axes. For driving the wheels $f$ to travel along the rails $l$ the motor $m$ will be connected with said wheels $f$ by means of a vertical shaft $i$ driven by said motor $m$ and provided with a bevel-gear meshing with a corresponding bevel-gear on the axle which is rigid or integral with said wheels $f$ as usual, suitable means being provided for uncoupling said shaft $i$ from the motor $m$ when the shafts $d$ are to be driven and for uncoupling the drive wheels $m'$ from said motor $m$ when the wheels $f$ are to be driven.

The legs $g$ are each formed of two sections hingedly connected together by the respective rods $v$ and $v'$ which are rigidly connected to the lower portions whereby partial rotation of said rods $v$ and $v'$ will cause a corresponding longitudinal swinging movement of said lower portions to the end that said lower portions may be swung rearwardly and upwardly to raise them so as not to strike against or contact with switches and crossings over which the machine may pass. The outer ends of the rods $v$ and $v'$ have respectively mounted thereon to turn therewith bevel-gears $y$ and $y'$ meshing with bevel-gears $x$ and $x'$ respectively which are connected together by means of a drive chain $u'$ whereby the movement of bevel-gear $x$ will be transmitted to bevel-gear $x'$ on the other side of the frame $c$. A hand shaft $t$ mounted for rotation on frame $c$ and extending vertically with relation thereto and to the frame $f'$ so as to be easily accessible to an operator standing or seated on the latter is provided with an actuating bevel-gear $u$ mounted thereon to turn therewith and meshing with bevel-gear $d$, whereby rotation of shaft $t$ will cause the raising or lowering of the legs $g$, according to the direction of such rotation.

The operation of the device, briefly stated, is as follows:

Assuming the machine to be traveling along the rails $l$ and to have reached the point where it is desired to shift the rails $l$ and $n$ of the corresponding tracks, the clutch connecting the shaft $i$ to the motor $m$ is moved to break such drive connection, the levers o and p are moved toward the left to vertical or substantially vertical position, whereby the hooks b and b' are caused to hook under their respective rails l and n. Thereafter the clutch governing connection between the motor m and drive wheels m' is moved to establish such drive connection, which results in driving the shafts d in a clockwise direction, whereby the wrist pins z will move in a clockwise direction until the axes of said wrist pins z lie in the same horizontal plane with the axes of the shafts d, at which time the legs g carried by the wrist pins e and their wrist pins z will rest upon the ground, and continued rotation of the shafts d will cause said shafts d to move through an arc of 180 degrees, over and beyond wrist pins z as shown by dot and dash line in the drawing as to the right-hand shaft d, such movement of the shafts d involving the raising and lateral displacement to the same extent of the main frame f' with its wheels f and with its cross beam a, consequently involving the lifting and lateral displacement of the tracks l—n in the same direction and to the same degree, and such operation may be continued until the said tracks have been moved laterally to the desired degree, after which the shafts d are preferably partially rotated until the cranks e lie in a vertical plane with the wrist pins z at the top, whereby the legs g will be held raised up out of contact with the ground, and thereafter or before, the levers o and p will be swung to the right about their pivots so as to move the hooks b and b' out of hooked engagement with the rails l and n respectively, after which the clutch connection between the motor m and the drive wheels m' will be disconnected and the shaft i will be put in driving connection with the motor m, and the machine will be moved to the next point at which it is desired to move the tracks laterally.

Having fully described my invention what I claim is:

1. In apparatus for laterally shifting railway tracks, a frame, wheels mounted on said frame and adapted to run on one of said tracks to transport the apparatus, means mounted on said frame for holding said track in fixed relation to said wheels, a pair of shafts mounted parallel to each other in suitable bearings on said frame, a source of power, means for coupling said source of power to said wheels, and means for coupling said source of power to said shafts to rotate said shafts in the same direction, in combination with a transverse bar, a pair of crank arms having their longitudinal central lines always disposed parallel to each other, and a pair of feet respectively mounted on the respective crank arms to move therewith about the respective axes of said shaft and disposed on opposite sides of said track and adapted to support the same and said apparatus during the actual lifting and transverse movement thereof, said crank arms being connected at one end to said shafts respectively to turn therewith.

2. In apparatus for laterally shifting railway tracks, a frame, wheels mounted on said frame and adapted to run on one of said tracks to transport the apparatus, and means mounted on said frame for holding said track in fixed relation to said wheels, in combination with a pair of crank arms mounted in suitable bearings carried by said frame, means for rotating said crank arms about their axes and in definite relation to each other, and a pair of feet respectively mounted on the respective crank arms to move therewith about the respective axes of said crank arms and disposed on opposite sides of said track and adapted to support the same and said apparatus during the actual lifting and transverse movement thereof.

3. Apparatus for laterally shifting a railway track and comprising a frame, and means for holding said track in fixed relation to said frame, in combination with a pair of crank arms mounted in suitable bearings in said frame, means for rotating said arms about their axes, and a pair of feet respectively mounted on the respective crank arms and disposed on opposite sides of said track and adapted to support the same and said apparatus during the actual lifting and transverse movement thereof.

4. Apparatus for laterally shifting railway tracks comprising a frame and wheels mounted on said frame and adapted to run on one of said tracks, in combination with a crank arm mounted in said frame, shifting means adapted to engage a second railway track to laterally shift the latter in accordance with the movement of the crank arm, and means associated with said crank arm for causing said movement of said shifting means.

HENDRIK BERNARDUS MARIE DE LANGE.